United States Patent [19]

Parker

[11] Patent Number: 5,054,572

[45] Date of Patent: Oct. 8, 1991

[54] FRONT WHEEL DRIVE SYSTEM FOR A MOTORCYCLE

[76] Inventor: James G. Parker, 229 Anita Pl., Santa Fe, N. Mex. 87501

[21] Appl. No.: 541,274

[22] Filed: Jun. 20, 1990

[51] Int. Cl.⁵ ............................................. B62K 11/12
[52] U.S. Cl. .................................. 180/224; 180/223; 180/231
[58] Field of Search ............... 180/219, 222, 223, 224, 180/231; 403/122, 164, 57

[56] References Cited

U.S. PATENT DOCUMENTS

| | | | |
|---|---|---|---|
| 3,045,772 | 7/1962 | Nicolai | 180/224 |
| 3,642,083 | 2/1972 | Rodier | 180/224 |
| 3,893,533 | 7/1975 | Tidwell | 180/224 |
| 4,526,249 | 7/1985 | Parker | 180/219 |
| 4,828,069 | 5/1989 | Hatsuyama | 180/219 |
| 4,917,209 | 4/1990 | Horiike | 180/223 |

FOREIGN PATENT DOCUMENTS

| | | | |
|---|---|---|---|
| 0575113 | 5/1959 | Canada | 180/223 |
| 88/09739 | 12/1988 | World Int. Prop. O. | 180/224 |
| 89/12570 | 12/1989 | World Int. Prop. O. | 180/219 |

OTHER PUBLICATIONS

"2-Wheel Drive Savard", by Luc Verbeke, Motocross Action, May 1990, pp. 40–43.

"2-Wheel Drive Damien Dream Toki", By Luc Verbeke, Motocross Action, May 1990, pp. 38–39.

Primary Examiner—Charles A. Marmor
Assistant Examiner—Anne Marie Boehler
Attorney, Agent, or Firm—Wiliam A.

[57] ABSTRACT

A front wheel drive system for a motorcycle. The system is particularly adapted to be incorporated in a one-sided front wheel suspension system. The front wheel drive system may be used alone, to provide a motorcycle having front wheel drive only, or it may be used in combination with a conventional rear wheel drive to provide a two wheel drive motorcycle. The system includes a control arm (24) which is pivotably attached to the motorcycle body (22) and which houses a drive chain (42). The drive chain is connected through a constant velocity ball joint to a second drive chain journalled in an upright kingpin (28), which connects to a wheel sprocket. The constant velocity joint allows power to be transmitted to the front wheel (12) while also allowing for steering and suspension motions of the front wheel. A universally pivotable yoke connects the forward end of the control arm (24) to the kingpin (28), through which weight and shock loads are transmitted from the front wheel through the control arm to the motorcycle body.

28 Claims, 12 Drawing Sheets

FIG. II.

FRONT WHEEL DRIVE SYSTEM FOR A MOTORCYCLE

BACKGROUND OF THE INVENTION

1. Field of the Invention

The invention described and claimed herein is generally related to motorcycles. More particularly, the present invention is related to front wheel drive systems for a motorcycle.

2. Description Of Related Art Including Information Disclosed Under 37 CFR 1.97-1.99.

It has long been recognized that motorcycle performance could be improved by the development of a two wheel drive system, in much the same way as the performance of other vehicles has been improved by the advent of four wheel drive systems. More specifically, it has been recognized that the advantages of improved traction during acceleration and improved control could be obtained by supplementing the conventional rear wheel drive train in a motorcycle with a front wheel drive mechanism.

Consequently, front wheel drive systems for motorcycles have long been sought. However, there are formidable engineering difficulties associated with the development of a front wheel drive system for motorcycles having conventional front wheel suspension systems, in which the front wheel is journalled to a conventional telescoping fork. To the applicant's knowledge there has not been previously available a commercially practicable front wheel drive system for such suspensions.

The applicant has previously disclosed and claimed a one-sided front suspension system for a motorcycle in his U.S. Pat. No. 4,526,249, issued on July 2, 1985. Now the applicant has developed a front wheel drive system that is particularly adapted to that one-sided suspension system. For reasons that will be fully apparent upon consideration of the descriptions below and the accompanying illustrations, the present invention combines the advantages of the one-sided suspension system with the advantages obtainable in a two-wheel drive system, to provide a motorcycle having substantially improved performance and ride characteristics.

Accordingly, it is the object and purpose of the present invention to provide a front wheel drive system for a motorcycle.

It is also an object and purpose of the present invention to provide a combined front wheel drive and front wheel suspension system for a motorcycle.

It is another object of the present invention to provide a one-sided front wheel suspension system for a motorcycle, having incorporated therein a front wheel drive system.

SUMMARY OF THE INVENTION

The foregoing and other objects are attained in the present invention, which provides a front wheel drive system for a motorcycle. The system includes an arm having a forward end and a rear end, with the rear end being hinged to the motorcycle body and extending generally forwardly therefrom. The arm extends along one side of the front wheel of the motorcycle and is spaced outwardly from the front wheel sufficiently to allow for rotational steering motion of the wheel. An upright kingpin extends along the same side of the front wheel as the arm, and is oriented at a rake angle with respect to the front wheel. The front wheel is journalled to the lower end of the kingpin, and the forward end of the arm is connected for universal pivotal motion to the kingpin. The arm supports a drive means, which preferably consists of a drive chain. In the preferred embodiment the drive chain is housed within the arm. The drive means operably connects a takeoff drive shaft, which extends from the motorcycle body at the rear of the arm, with a forward drive shaft that extends transversely from and which is journalled in the forward end of the arm. The forward drive shaft is connected through a constant velocity joint to a front wheel drive means that is mounted on the kingpin. The constant velocity joint operates to transmit power from the forward drive shaft to the front wheel drive means. In the preferred embodiment the front wheel drive means includes a wheel drive chain and a pair of associated sprockets that connect the constant velocity joint with the front wheel. This arrangement permits power to be continuously transmitted directly to the front wheel while also allowing the front wheel to undergo limited rotational and translational displacement due to steering rotation and suspension travel.

The forward end of the arm preferably includes an integral shaft housing, which is connected to the kingpin for universal pivotal motion by a tubular yoke which is rotatably retained on the shaft housing, and which is connected to the kingpin by a pair of pivot pins that are positioned coaxially with the steering axis of the kingpin. The yoke transmits weight and shock loads from the kingpin to the arm, while also permitting the front wheel to undergo limited rotational steering motion and suspension travel.

In the preferred embodiment the constant velocity joint is a ball-and-socket constant velocity joint, with the ball element being integrally formed at the end of the front drive shaft and the socket element having an integral drive shaft which is journalled in the kingpin an which is splined to kingpin chain sprocket.

The present invention is particularly adapted to be incorporated in a one-sided front wheel suspension system, wherein there is an upper control arm and a lower control arm, each of which has a forward end and a rear end. The control arms are hinged at their rear ends to the motorcycle body, and extend generally forwardly therefrom. The lower control arm extends along one side of the front wheel of the motorcycle, and is spaced outwardly therefrom sufficiently to allow for the front wheel to rotated through its ordinary range of steering. The upright kingpin extends along the same side of the front wheel as the lower control arm. The kingpin is oriented at a rake angle with respect to the front wheel, with the upper end of the kingpin extending around the wheel. The forward end of the upper control arm is connected for universal pivotal motion to the upper end of the kingpin. The front wheel is journalled to the lower end of the kingpin by means of a cantilevered axle assembly which extends from one side of the lower end of the kingpin. The upper end of the kingpin is connected to a steering column.

The lower control arm supports a drive means that extends along its length. The drive means operably connects a power takeoff drive shaft, which extends from the motorcycle body at the rear of the lower control arm, with a forward drive shaft. The forward drive shaft extends transversely from, and is journalled in, the forward end of the lower control arm. The forward drive shaft is connected through a constant velocity joint to a wheel drive means mounted on the kingpin as noted above. The constant velocity joint transmits power from the forward drive shaft to the front wheel, while also allowing the front wheel and the kingpin to undergo limited rotational and translational displacement due to steering rotation and suspension travel.

The front drive shaft is preferably journalled within an integral, tubular shaft housing that extends transversely from the forward end of the lower control arm. The tubular shaft housing is connected to the kingpin by a tubular yoke that is positioned coaxially about the front drive shaft. The yoke is rotatable about the tubular shaft housing, but is retained against axial displacement relative thereto. The yoke is further hinged to the kingpin by two pivot pins, which have coaxial axes of rotation which are coaxial with the axis of steering rotation of the kingpin. The yoke operates to bear and transmit weight and shock loads between the front wheel and the motorcycle body, thereby relieving stresses on the constant velocity joint and leaving it free to function exclusively to transmit power to the front wheel.

In the preferred embodiment the wheel drive means includes a kingpin sprocket which is journalled to the kingpin. The wheel axle assembly includes a wheel sprocket, and the wheel sprocket and the kingpin sprocket are connected by a wheel drive chain that extends along the kingpin.

The constant velocity joint is a preferably a ball-and-socket constant velocity joint, with the kingpin sprocket being splined to a splined end of a shaft extending from a socket element of the ball-and-socket constant velocity joint. The shaft from the socket element extends through the kingpin, and is journalled in bearings in the kingpin.

The kingpin preferably includes an integral kingpin housing in which the constant velocity joint is housed. The housing opens toward the tubular shaft housing. The yoke includes integral, opposing ears at its end distal from the shaft housing. The kingpin housing is sized to receive the opposing ears of the yoke, with the ears of the yoke including threaded bores for engaging the two pivot pins. The pivot pins extend through opposing bores in the housing to engage the ears of the yoke. A flexible dust boot extends between the kingpin housing and the shaft housing so as to enclose the yoke and the constant velocity joint.

As already noted, the constant velocity joint is preferably a ball-and-socket constant velocity joint. The front drive shaft preferably includes at one end an integral ball element of the ball-and-socket constant velocity joint.

The drive means in the lower control arm preferably includes a drive chain. The drive chain may be preferably housed within the lower control arm. The control arm drive chain is engaged at the rear end of the lower control arm with a takeoff drive shaft which extends from the motorcycle body coaxially with the axis of rotation of the lower control arm with respect to the motorcycle body. The control arm drive chain is engaged at the forward end of the lower control arm with a forward drive sprocket that is splined to the forward drive shaft.

In the combined suspension and drive system, the rear end of the lower control arm preferably includes integral left-hand and right-hand sections. One of these sections houses the control arm drive chain and extends forwardly from the side of the motorcycle body from which the takeoff drive shaft extends. This section is journalled in a first pivot bearing which is seated in the motorcycle body coaxially about the takeoff drive shaft. The second section extends transversely in front of the motorcycle body to a pivot plate, which is removably connected to end of the second section. The pivot plate is journalled to a second pivot bearing seated in the motorcycle body and oriented coaxially with the first pivot bearing. The pivot plate may include an adjustable and lockable pivot adjustor, which is journalled in the second bearing, and which allows the lower control arm to be installed and adjusted free of play.

These and other aspects of the present invention will be more apparent upon consideration of the following detailed description of the invention, when taken with the accompanying drawings.

BRIEF DESCRIPTION OF THE DRAWINGS

The Figures set forth in the accompanying drawings form a part of this specification and are hereby incorporated by reference. In the drawings.

DESCRIPTION OF THE PREFERRED EMBODIMENTS

Figure 1:
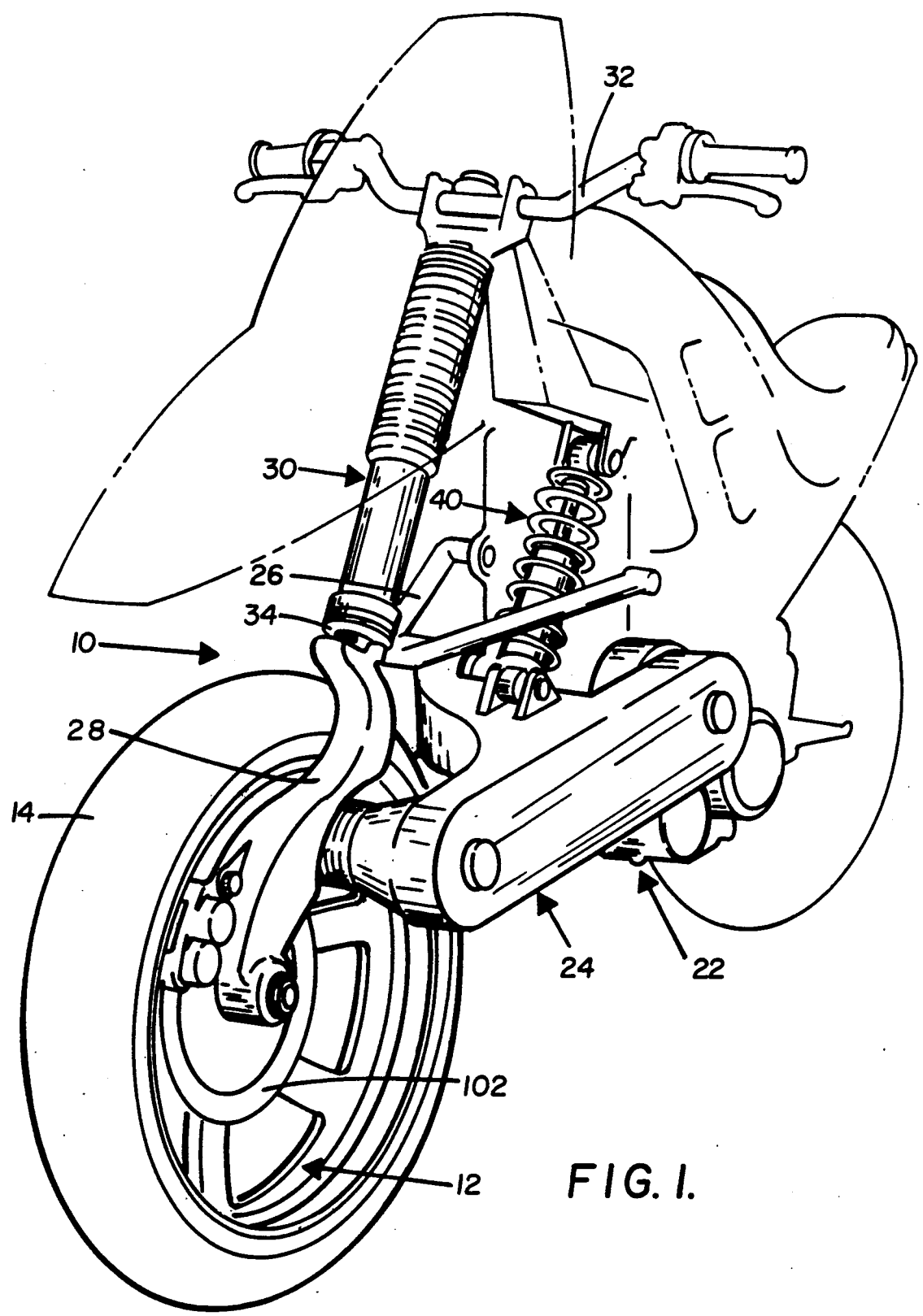
FIG. 1 is a front quarter isometric view of a motorcycle having a one-sided front wheel suspension system, and which includes the front wheel drive system of the present invention.
Figure 2:
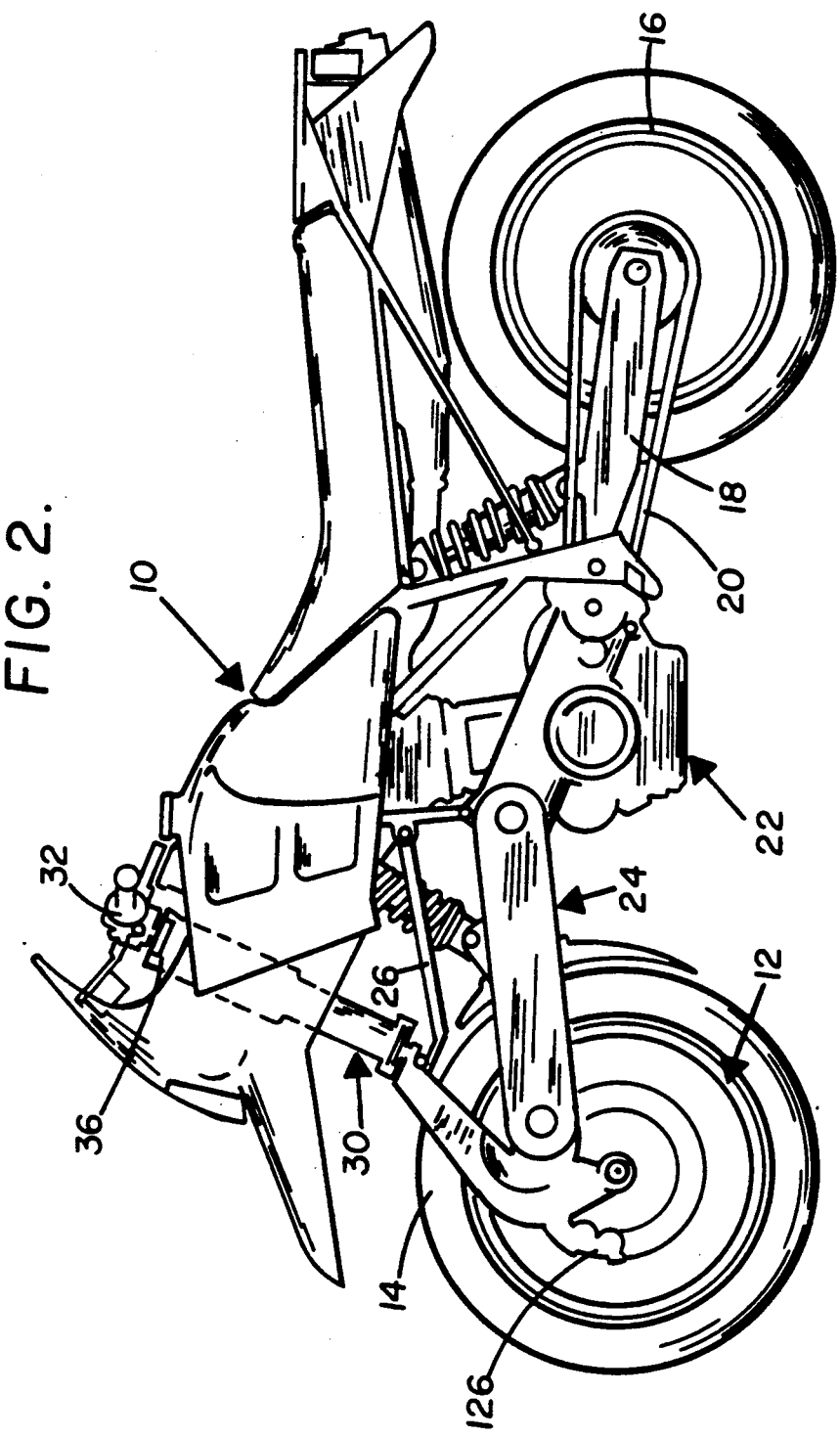
FIG. 2 is a left side view of the motorcycle of FIG. 1.
Figure 3:
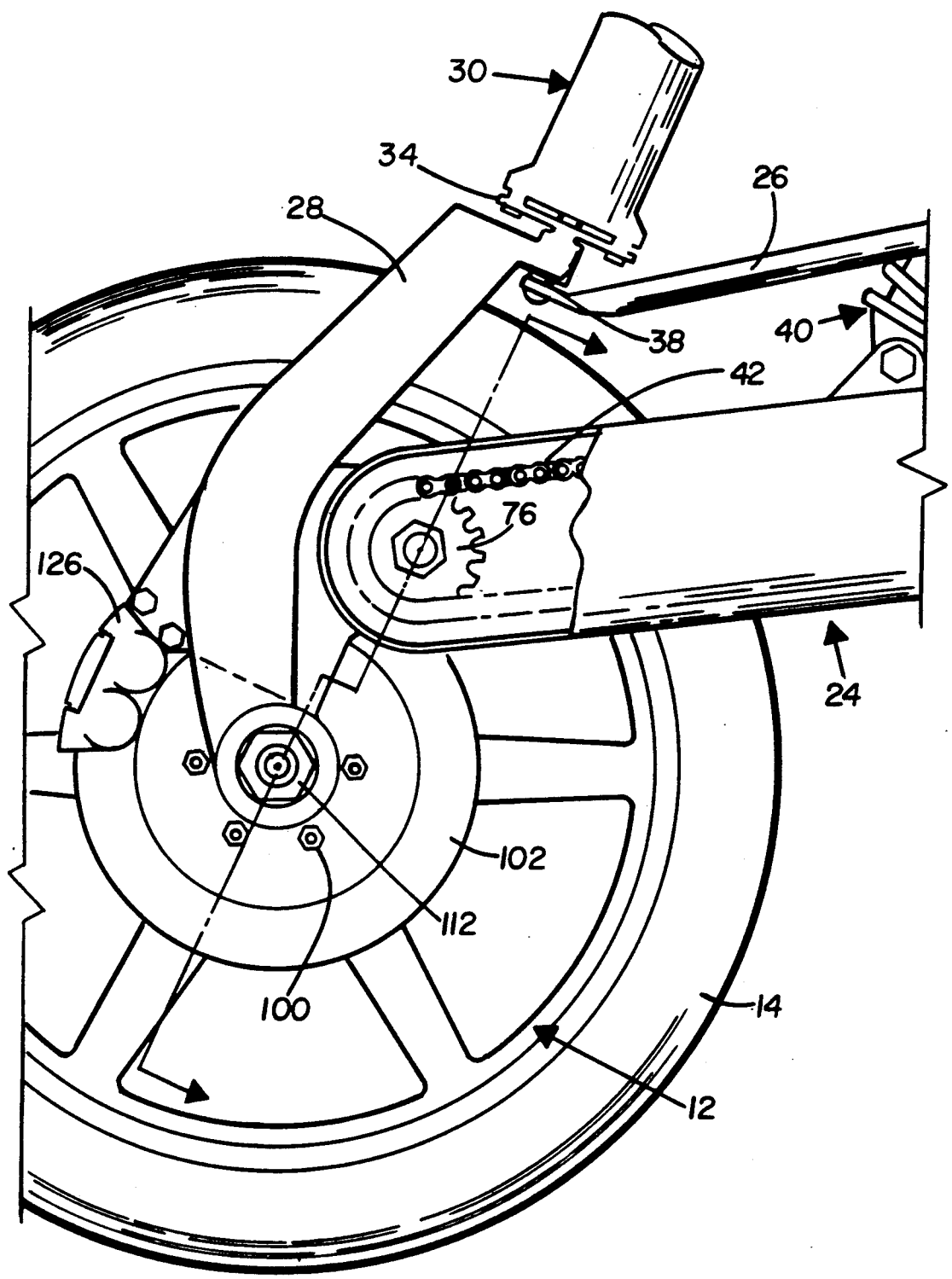
FIG. 3 is an enlarged left side view in partial cross section of the front wheel and the front wheel drive and suspension system of the motorcycle of FIG. 1.
Figure 4:
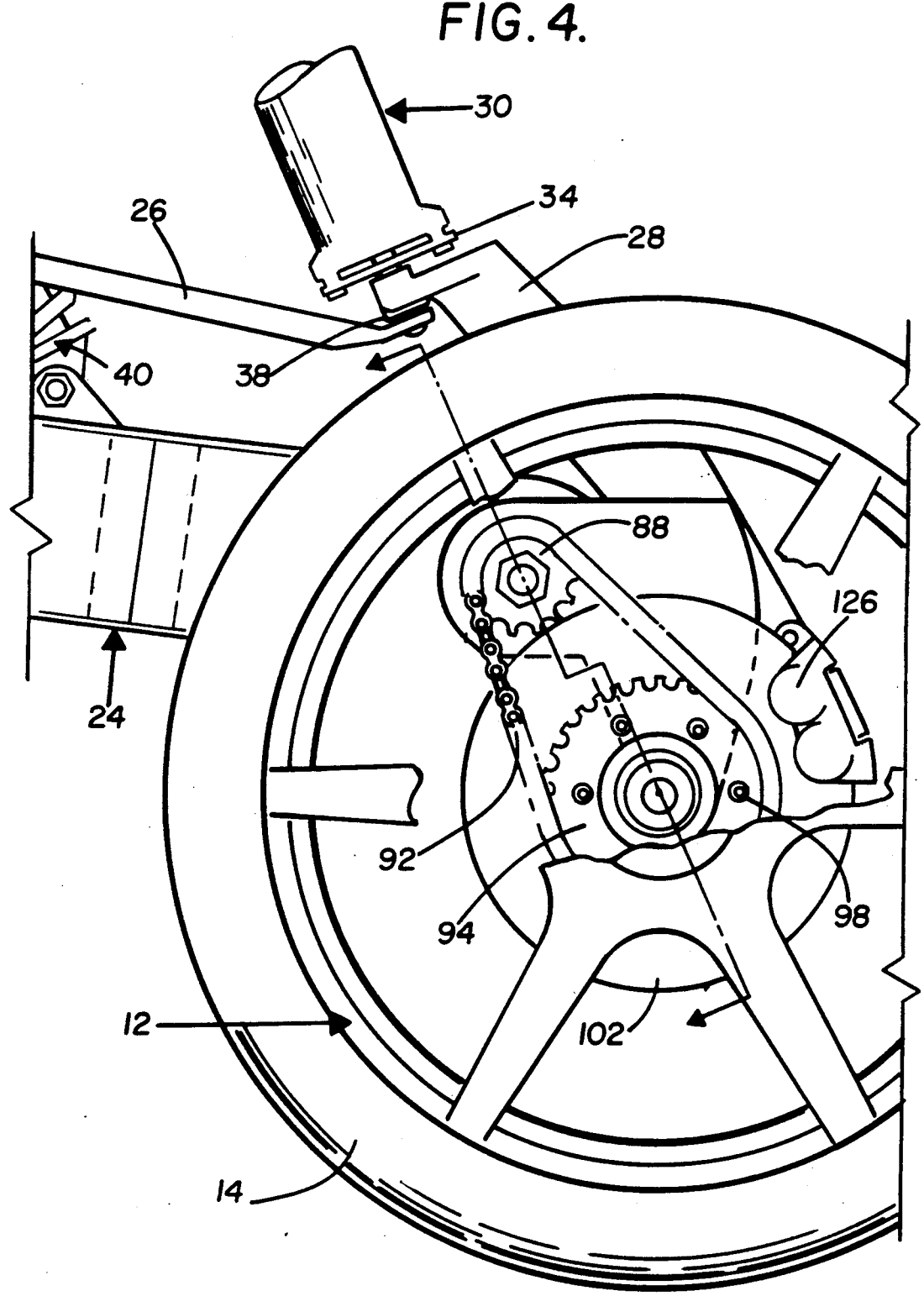
FIG. 4 is an enlarged right side view in partial cross section of the front wheel and the front wheel drive and suspension system of the motorcycle of FIG. 1.
Figure 5:
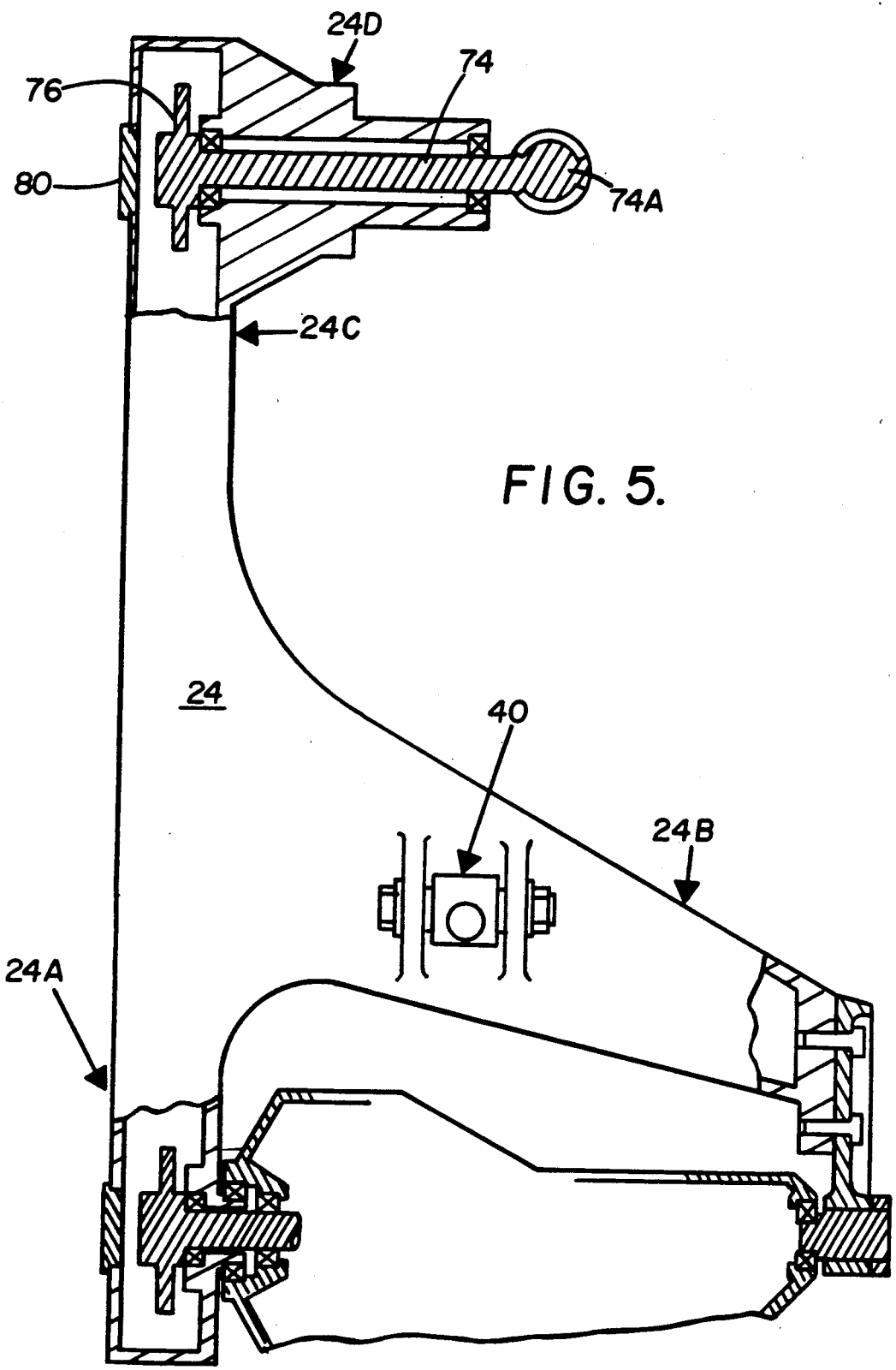
FIG. 5 is a plan view in partial cross section of the lower control arm of the front wheel drive and suspension system.

Referring first particularly to FIGS. 1 and 2, there is illustrated a motorcycle 10 which is provided with the preferred embodiment and the best mode known to the inventor of the front wheel drive system of the present invention. The motorcycle 10 generally includes a front wheel 12 with a tire 14, and a rear wheel 16 which is journalled to a rear swing arm 18. The rear wheel 16 is driven by a rear drive chain 20. The front wheel 12 is journalled to the front wheel drive and suspension system of the present invention, which is described below. Both the front wheel drive and suspension system and the rear swing arm 16 generally extend from and are hinged to a motorcycle body 22. For the purposes of this specification, the term "motorcycle body" 22 is defined to include generally the motorcycle engine and transmission and their associated supporting structures, possibly but not necessarily including a frame, and which may be separate from the engine and transmission or may be integrated therewith. It should be further understood that the engine, transmission and their related supporting structures may be integrated or arranged in various ways, and that the motorcycle body 22 is thus considered to refer generally to the engine, transmission and related structures which generally constitute the major portion of the weight of the motorcycle and which generally define the center of gravity of the motorcycle.

The front wheel 12 is connected to the motorcycle body 22 through the front wheel drive system of the present invention, and the associated one-sided front suspension system, which includes a lower control arm 24 and an upper control arm 26. The upper and lower control arms 24 and 26 are each pivotably hinged to the motorcycle body 22 for swinging motion in a vertical plane that extends parallel to the longitudinal axis of the motorcycle.

The upper and lower control arms 24 and 26 extend forwardly to an upright kingpin 28, which extends alongside the left side of the front wheel 12. The kingpin 28 is generally positioned to as to extend at a rake angle similar to the rake angle of a conventional forked suspension system. The upper end of the kingpin 28 curves around and behind the top of the wheel 12 and tire 14, and is connected to a telescoping, splined steering column 30, which is in turn connected to a handlebar 32. The lower end of the steering column 30 is connected to the upper end of the kingpin 28 by means of a flexible disk coupling 34, which allows the steering column 30 to bend slightly with respect to the kingpin 28 during suspension travel of the front wheel 12 and kingpin 28, while nevertheless maintaining a torsionally rigid connection between the kingpin 28 and the steering column 30 in order to retain positive steering control. A second flexible disk coupling 36 (FIG. 2) is provided between the handlebar 32 and the upper end of the steering column 30.

The upper control arm 26 is generally triangular in shape and is hinged at its rear end to the motorcycle body 22. The forward end of the upper control arm 26 is connected to the upper end of the kingpin 28 by a universal pivot joint 38, which is preferably a ball joint that is centered on the intersection of the steering axis of column 30 and the center plane of the wheel 12. The front wheel 12, together with the kingpin 28 and control arms 24 and 26, are sprung and damped by a spring-loaded shock absorber assembly 40, which extends between from the motorcycle body 22 through the opening in the upper control arm 26, to the lower control arm 24.

It will be appreciated that the major elements of the structures broadly described thus far essentially constitute, in function and structure, the one-sided front suspension system previously described in the above-referenced U.S. Pat. No. 4,526,249, which is hereby incorporated by reference in full for all that it discloses. The front wheel drive system of the present invention is incorporated in and constitutes a novel combination with that one-sided suspension system, as described further below.

Referring now to FIGS. 5 through 8, in the present invention the lower control arm 24 extends forwardly from the left side of the motorcycle body 22 and is spaced outwardly from the left side of the front wheel 12 and tire 14. The lower control arm 24 serves two functions. First, it is the primary weight and load bearing structure of the front wheel suspension system, operating to transfer weight and shock loads in a direct path from the front wheel 12 to the motorcycle body 22. Secondly, the lower control arm 24 functions as a hollow housing which houses a control arm drive chain 42. Because it functions as a housing for the control arm drive chain 42, which extends nearly the full length of the lower control arm 24, the lower control arm 24 is straight over most of its length, as opposed to being arcuately curved as disclosed in the above-referenced patent.

The lower control arm 24 is a generally tubular structure having a rectangular cross section. For the purposes of this description, it may be described as having a left-hand rear end section 24a, a right-hand rear end section 24b, and a front end section 24c, all of which are integral portions of the lower control arm 24. Additionally, the arm 24 includes an integrally formed transverse tubular shaft housing 24d, which extends transversely from the front end section 24c toward the front wheel 12. These elements of the lower control arm 24 are described in further detail below.

Figure 6:
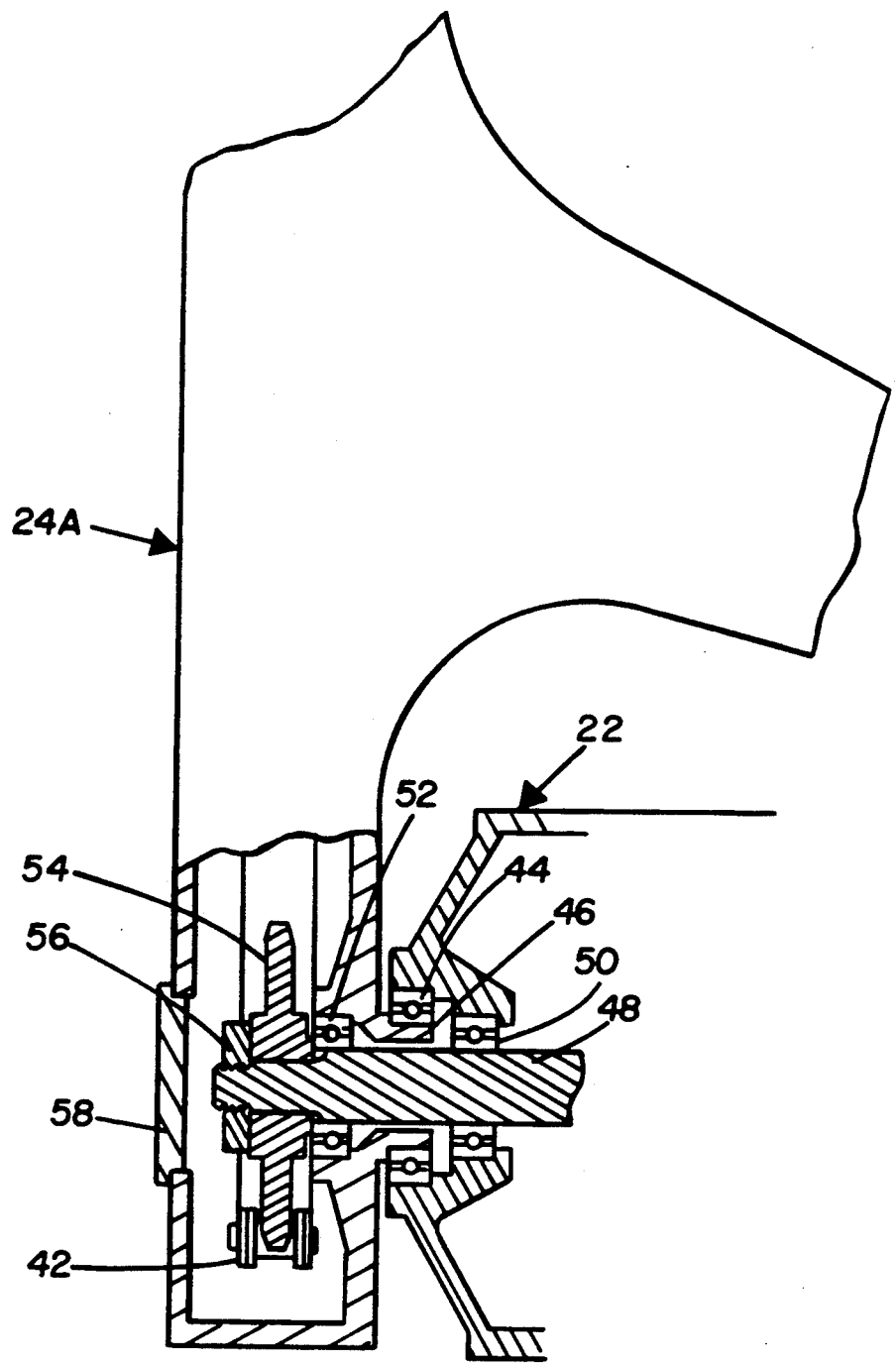
FIG. 6 is a plan view in partial cross section of the rear left side of the lower control arm of FIG. 5.

Referring particularly to FIG. 6, the left-hand rear end section 24a of the lower control arm 24 is pivotably attached to the left side of the motorcycle body 22 by means of a left-hand pivot bearing 44 which is seated in an outwardly opening annular recess in the motorcycle body 20. The left-hand rear end section 24a includes an integral tubular flange 46 which extends into the left-hand pivot bearing 44. The pivot bearing 44 is centered on and encircles a primary take-off drive shaft 48, which extends from the motorcycle transmission within the motorcycle body 22. The drive shaft 48 is journalled in a first bearing 50, which is seated in the motorcycle body 22, and is also journalled in a second bearing 52, which is seated in the left-hand rear end section 24a of the lower control arm 24. A rear chain sprocket 54 is splined to the end of the drive shaft 48. The chain sprocket 54 is retained on the drive shaft 48 by a retaining nut 56. Access to the retaining nut 56 is through a hole in the outer wall of the left-hand rear end section 24a, which is covered by a dust cover plate 58.

Figure 7:
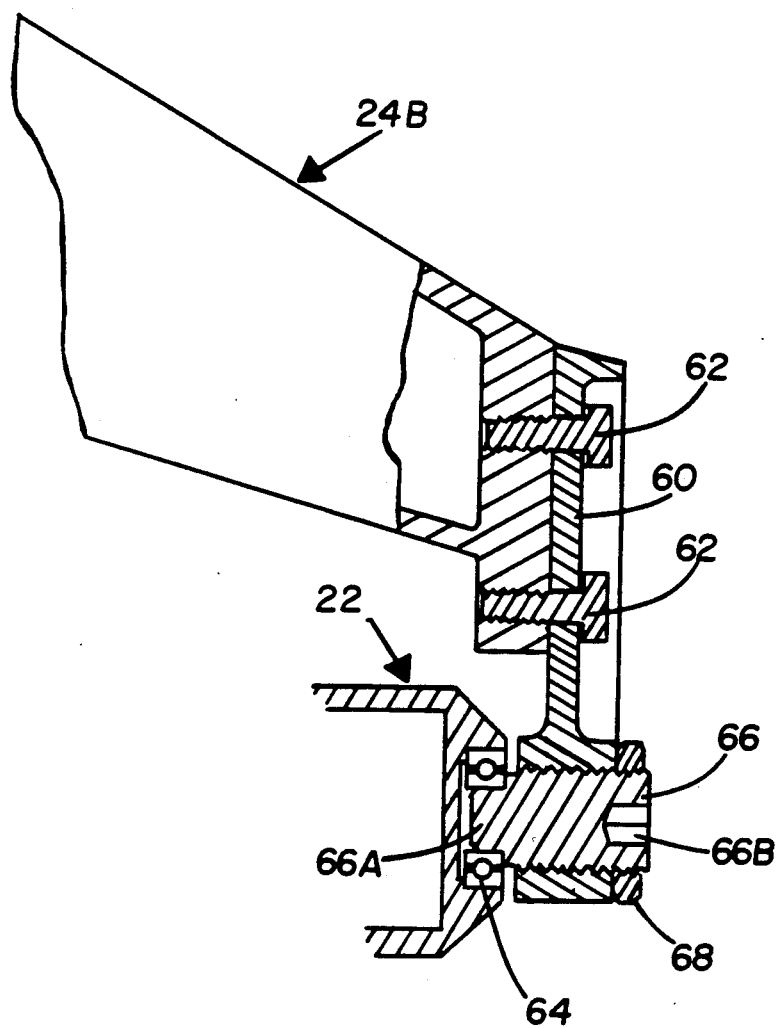
FIG. 7 is plan view in partial cross section of the rear right side of the lower control arm of FIG. 5.

Referring now to FIG. 7, the right-hand rear end section 24b terminates and is bolted to a right-hand pivot plate 60 by bolts 62. This is done to allow installation of the lower arm 24 onto the motorcycle body 22. The right-hand pivot plate 60 is journalled in a right-hand pivot bearing 64 by means of a outside threaded pivot adjuster 66. The right-hand pivot bearing 64 is coaxial with the left-hand pivot bearing 44 and is seated in an outwardly opening circular recess formed in the motorcycle body 22. The threaded adjuster 66 is engaged in a cooperable threaded bore formed in the pivot plate 60. The adjuster 66 includes a short end shaft 66a, which is set into the bearing 64, and a hexagonal bore 66b at its outer end, by which the adjuster 66 may be rotated relative to the pivot plate 60. The pivot adjuster 66 is locked in position with respect to the pivot plate by a locking nut 68 which is engaged on the outer end of the pivot adjuster 66 and which abuts the pivot plate 60.

The function of the pivot plate 60 and pivot adjuster 66 are to allow the lower control arm 24 to be installed on the motorcycle body 22, and also to allow the lower control arm 24 to be precisely positioned and retained in the pivot bearings 44 and 64 so as to be free of lateral play.

Figure 8:
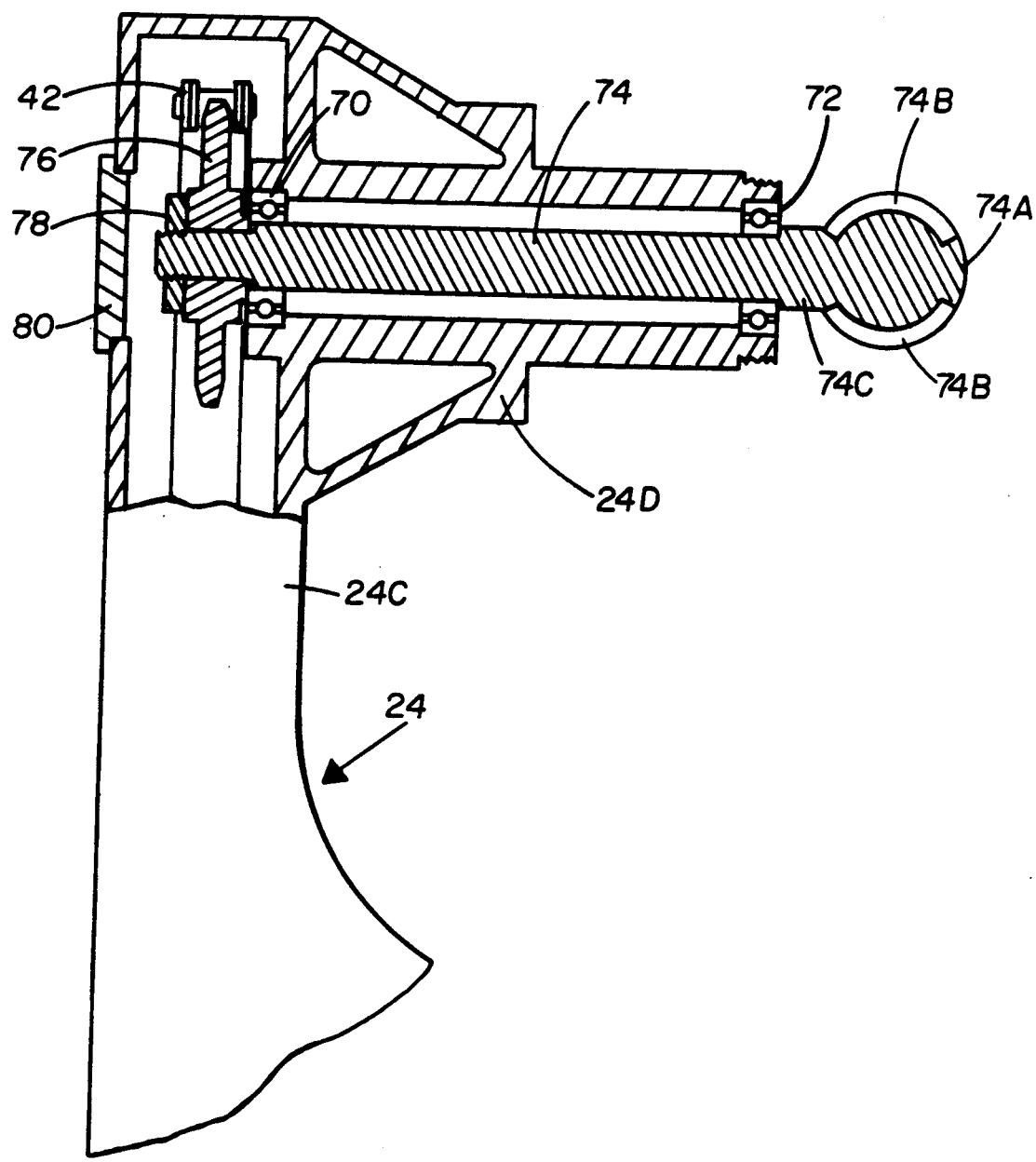
FIG. 8 is a plan view in partial cross section of the front end of the lower control arm of FIG. 5.

Referring to FIG. 8, the front end section 24c and the integral transverse shaft housing 24d contain a pair of coaxial bearings 70 and 72, in which there is journalled a front drive shaft 74. The inner end of the front drive shaft 74 terminates inside the front end section 24c of the lower control arm 24, where it is splined to a front chain sprocket 76 that engages the drive chain 42. A locking nut 78 retains the sprocket 76 on the splined end of the shaft 74. Access to the locking nut 78 is through a hole in the outer wall of front end section 24c, which is covered with a dust cover 80.

Figure 9:
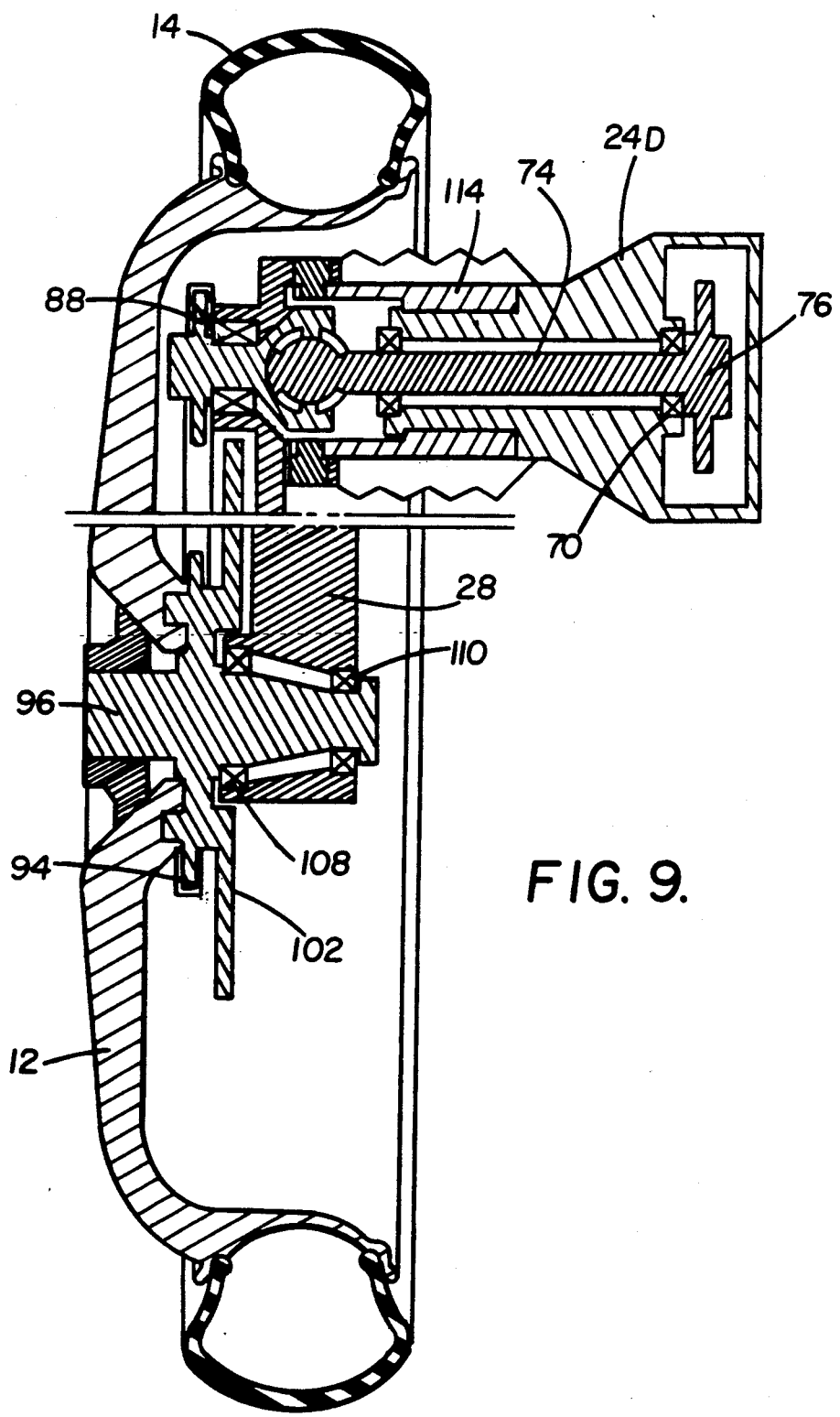
FIG. 9 is a sectional view, taken along the offset section lines shown in FIGS. 3 and 4, through the upright kingpin and the wheel axle assembly.
Figure 10:
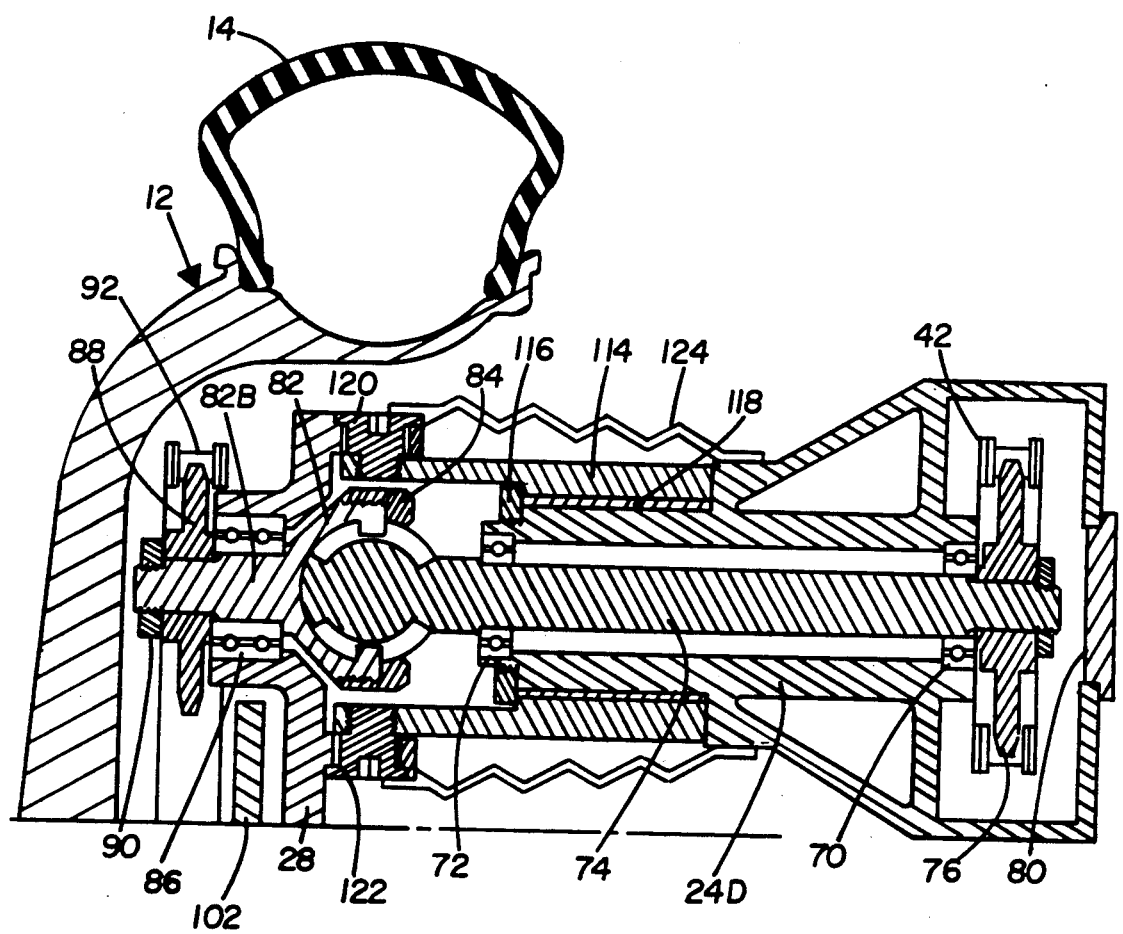
FIG. 10 is an enlarged view of the upper half of FIG. 9.

Referring to FIGS. 8, 9, and 10, the outer end of the front drive shaft 74 terminates in an inner ball element 74a of a constant velocity joint assembly. The inner ball element 74a is integrally formed at the end of the drive shaft 74. The ball element 74a includes two meridional slots 74b. The drive shaft 74 includes an enlarged neck 74c adjacent the ball element 74a, which abuts bearing 72. The enlarged neck 74c and the splined sprocket 76 and associated locking nut 7 locate the shaft 74 axially and preclude axial displacement of the shaft 74 relative to the shaft housing 24c. The inner ball element 74a is engaged in a cooperable ball socket 82. The ball element 74a is retained in the ball socket 82 by a threaded retaining member 84, which is illustrated in FIG. 10. The ball socket 82 includes two integral, cylindrical drive pins 82a, which extend radially inwardly from opposite sides of the interior spherical surface of the ball socket 82, and which are coaxial with one another. The drive pins 82a engage the meridional slots 74b of ball element 74a. The ball socket 82 also includes a integral socket drive shaft 82b, which extends through, and is journalled, in a double bearing 86 that is seated in the kingpin 28. Further in this regard, the double bearing 86 and the ball socket 82 are positioned in a circular housing 28a, which is integrally formed in the upright kingpin 28. The double bearing 86 is seated in bore passing through the kingpin 28.

Figure 12:
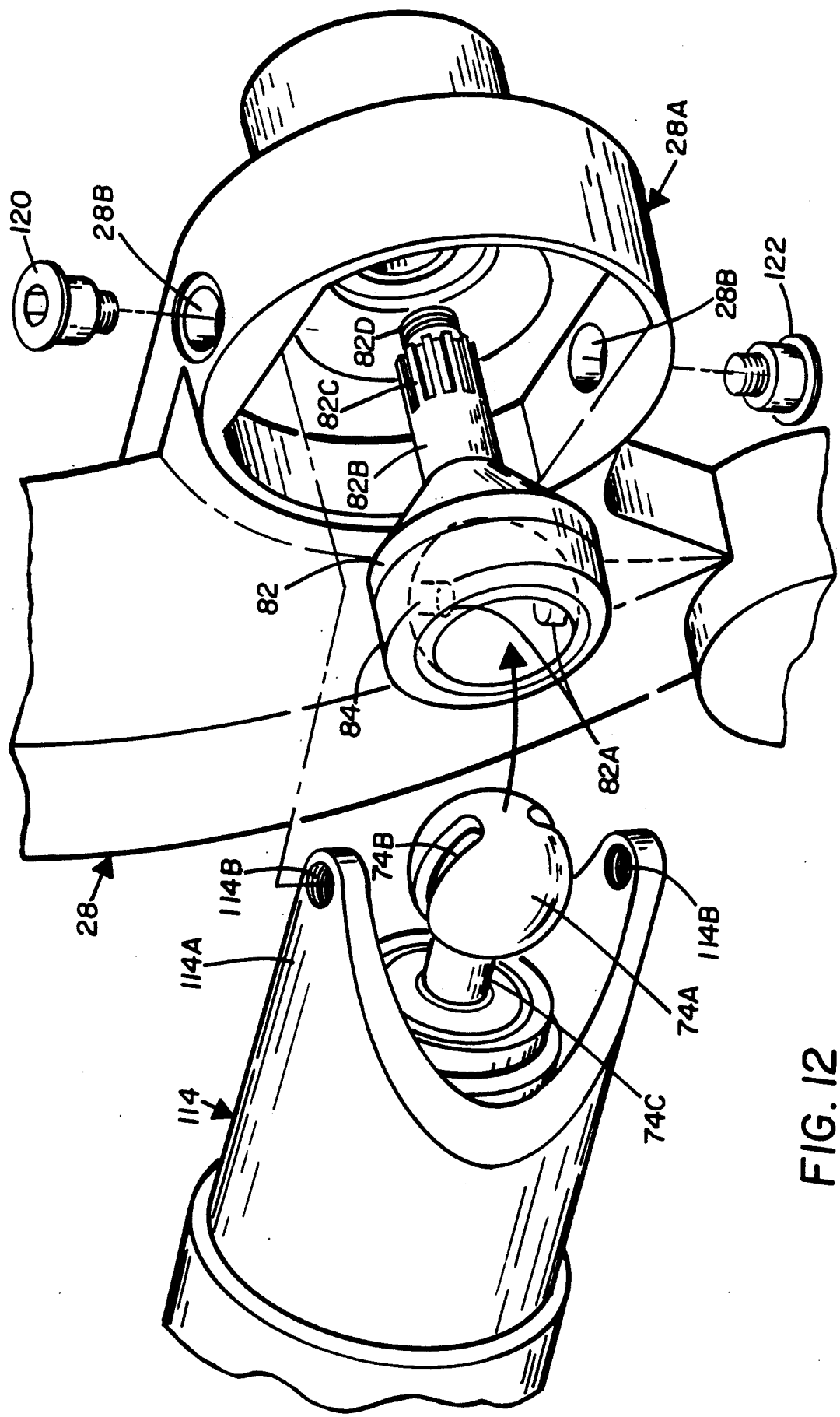
FIG. 12 is an exploded isometric of the constant velocity joint assembly connecting the lower control arm to the upright kingpin.

The outer end of the ball socket drive shaft 82b, which extends through and beyond the double bearing 86, includes splines 82c and end threads 82d (FIG. 12). A kingpin chain sprocket 88 is splined to the splined portion 82c of the shaft 82b, and is retained on the shaft 82b by a locking nut 90. The kingpin sprocket 88 drives a wheel drive chain 92.

Figure 11:
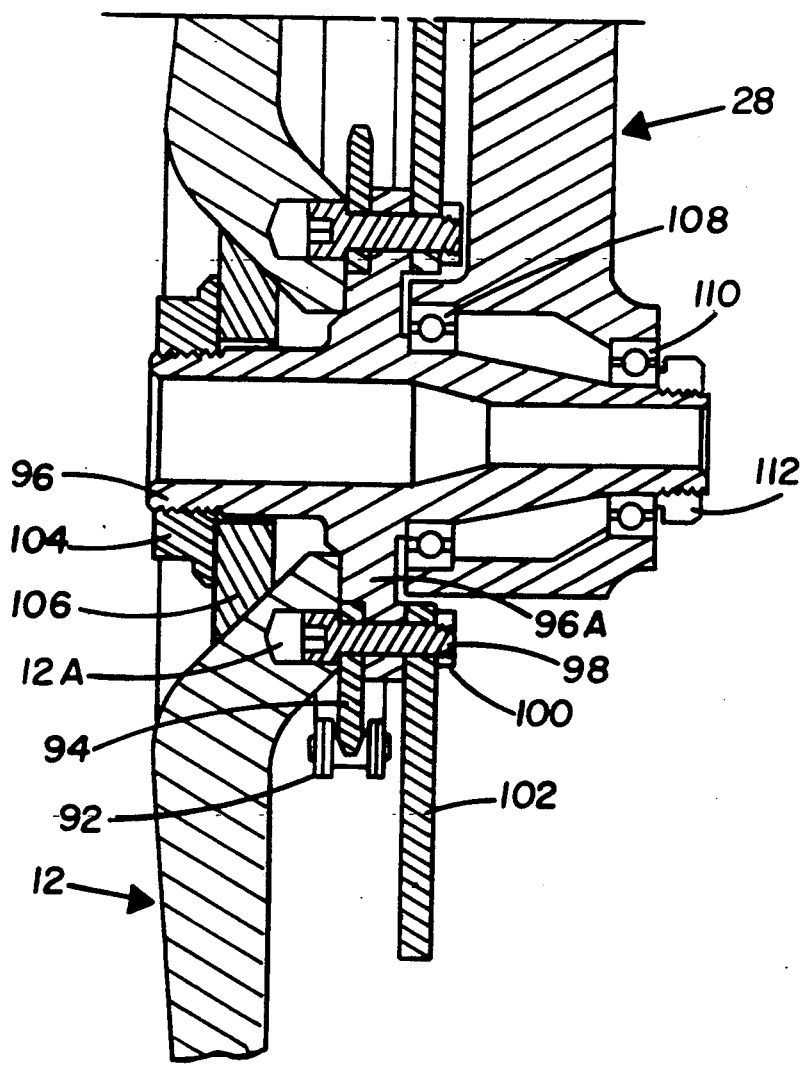
FIG. 11 is an enlarged view of the lower half of FIG. 9.

Referring to FIG. 11, the wheel drive chain 92 is engaged with a wheel sprocket 94, which is bolted to a large flange 96a, which extends radially from the front wheel axle 96, by a set of six bolts 98 and associated nuts 100. The bolts 98 and nuts 100 also affix a brake disk 102 to the wheel axle flange 96a.

The front wheel 12 is affixed to the front wheel axle 96 by means of a large wheel fixing nut 104 and an associated wheel fixing washer 106. The nut 104 engages a threaded end of the axle 96, and drives the fixing nut 104 and the wheel 12 against the large flange 96a.

Still referring to FIG. 11, the wheel 12 includes a set of six cylindrical bores 12a which locate on the heads of the bolts 98, so as to preclude rotation of the wheel 12 with respect to the axle 96 and its integral flange 96a. For this purpose, the bolts 98 include cylindrical heads with hex drive bores. The wheel bores 12a fit closely over the bolt heads to precisely locate the wheel 12 on the axle 96.

The front wheel axle 96 is journalled in two bearings 108 and 110 which are seated in a bore that extends through the lower end of the upright kingpin 28. The axle 96 is retained in the bearings 108 and 110 by means of an axle nut 112.

Steering rotation and suspension travel of the kingpin 28 with respect to the lower control arm 24 are accommodated by a steering and suspension motion yoke 114 (FIG. 12). The yoke 114 is in the form of a tubular cylindrical member that slips over the outer end of the shaft housing 24d of the lower control arm 24. The yoke 114 is retained on the end of the shaft housing 24d by means of a threaded retaining ring 116, which is threaded onto the end of the shaft housing 24d. The yoke 114 is rotatable about the shaft housing 24d on a tubular bushing 118, which is also retained on the shaft housing 24d by the retaining ring 116. The yoke 114 includes two integral ears 114a, which include coaxial threaded bores 114b (FIG. 12). The ears 114a extend into the circular housing 28a, where they are engaged by a pair of threaded pivot pins 120 and 122, which pass through a pair of coaxial bores 28b formed in the circular housing 28a. The axes of bores 28b and of the pivot pins 120 and 122 are coaxial with the axis of steering rotation of the upright kingpin 28, and are also coaxial with the centers of the ball element 74a and the socket 82 when the constant velocity joint is fully assembled. A flexible bellows-type dust cover 124 extends between the circular housing 28a and the shaft housing 24d, to exclude dust from constant velocity joint assembly.

The yoke 114, pivot pins 120 and 122, and housing 28a function together as a universal joint to bear and transmit shock and weight loads between the front wheel 12 and the lower control arm 24, thereby relieving the constant velocity joint from weight and shock loads and thereby allowing the constant velocity joint to be devoted exclusively to transmitting power to the front wheel 12. It will be noted in this regard that the axes of rotation of the pivot pins 120 and 122 are coaxial with the axis of steering rotation of the front wheel 12 as well as the kingpin 28. Additionally, the steering axis passes through the geometric center of the constant velocity joint and the universal pivot joint 38.

The system further includes a conventional brake caliper 126, which is mounted on the lower end of the kingpin 28 so as to straddle the brake disk 102.

It will be seen that the assembly described above operates to transmit power directly from the takeoff drive shaft 48 to the front wheel 12, while also accommodating the rotational and translational motions which the front wheel undergoes during steering and during suspension travel.

This is accomplished while also obtaining the advantages of the one-sided front wheel suspension system, which have been described in greater detail in the above referenced U.S. Pat. No. 4,526,249. The combination of the previously disclosed one-sided suspension and the front wheel drive system of the present invention enables the construction of motorcycles having substantially improved performance, both with respect to traction, acceleration and control and with respect to ride and handling.

The present invention is intended and contemplated to supplement the conventional rear wheel drive train of a motorcycle, to result in a two wheel drive system having the advantages noted above. It will be understood however that the front wheel drive system of the present invention is independent of any rear wheel drive system, and that the front wheel drive system of the present invention may be employed alone and as a substitute for the usual rear wheel drive system in a motorcycle.

The present invention has been described and illustrated with reference to a preferred embodiment. Nevertheless, it will be understood that various modifications, alterations and substitutions may be apparent to one of ordinary skill in the art, and that such modifications, alterations and substitutions may be made without departing from the essential invention. Accordingly, the scope of the patent protection sought for the present invention is defined by the following claims.

I claim:

1. A front wheel drive system for a motorcycle having a motorcycle body and a front wheel, comprising:
    an arm having a forward end and a rear end, said arm being hinged at said rear end to said motorcycle body and extending generally forwardly therefrom, said arm extending along one side of said front wheel of said motorcycle and being spaced outwardly therefrom sufficiently to allow for steering motion of said front wheel;
    an upright kingpin extending along the same side of said front wheel as said arm, said kingpin being oriented at a rake angle with respect to said front wheel; said forward end of said arm being connected for universal pivotal motion to said kingpin;
    said arm supporting a drive means extending its length and operably connecting a takeoff drive shaft extending from said motorcycle body with a forward drive shaft extending transversely from said journalled in said forward end of said arm, said forward drive shaft being connected through a constant velocity joint to a wheel drive means mounted on said kingpin, said wheel drive means including a kingpin sprocket journalled to said kingpin and an axle assembly including a wheel sprocket, said wheel sprocket and said kingpin sprocket being connected by a wheel drive chain extending along said kingpin, said wheel drive means thereby connecting said constant velocity joint with said front wheel so as to transmit power from said forward drive shaft to said front wheel;
    whereby power may be continuously transmitted directly to said front wheel while also allowing said front wheel to undergo limited rotational and translational displacement due to steering rotation and suspension travel.

2. The front wheel drive system for a motorcycle defined in claim 1, wherein said constant velocity joint is a ball-and-socket constant velocity joint, and wherein said kingpin sprocket is splined to a splined end of a shaft extending from a socket element of said ball-and-socket constant velocity joint, said shaft extending from said socket element through said kingpin, and said shaft being journalled in said kingpin between said socket element and said splined end.

3. The front wheel drive system for a motorcycle defined in claim 1, wherein said front drive shaft is journalled within a tubular shaft housing extending transversely from said forward end of said arm, and wherein said tubular shaft housing is connected for universal pivotal motion to said kingpin by a tubular yoke positioned coaxially about said front drive shaft, said yoke being rotatable about said tubular shaft housing and being retained against axial displacement relative thereto, and said yoke being hinged to said kingpin by two pivot pins having axes of rotation which are coaxial with the axis of steering motion of said kingpin.

4. The front wheel drive system for a motorcycle defined in claim 3, wherein said kingpin includes an integral kingpin housing in which said constant velocity joint is housed, said housing opening toward said tubular shaft housing,
    said yoke including integral opposing ears at its end distal from said shaft housing, said kingpin housing being sized to receive said opposing ears of said yoke, said ears of said yoke including threaded bores for engaging said pivot pins, and wherein said pivot pins extend through opposing bores in said housing to engage said ears of said yoke.

5. The front wheel drive system for a motorcycle defined in claim 4 further comprising a flexible dust boot extending between said kingpin housing and said shaft housing so as to exclude dust from said yoke and said constant velocity joint.

6. The front wheel drive system for a motorcycle defined in claim 1 wherein said constant velocity joint is a ball-and-socket constant velocity joint, and wherein said front drive shaft includes at one end an integral ball element of said ball-and-socket constant velocity joint.

7. The front wheel drive system for a motorcycle defined in claim 3 wherein said constant velocity joint is a ball-and-socket constant velocity joint, and wherein said front drive shaft includes at one end an integral ball element of said ball-and-socket constant velocity joint.

8. The front wheel drive system for a motorcycle defined in claim 1, wherein said drive means supported by said arm comprises a drive chain.

9. The front wheel drive system for a motorcycle defined in claim 8, wherein said drive chain supported by said arm is housed within said arm.

10. The front wheel drive system for a motorcycle defined in claim 9, wherein said drive chain is engaged at said rear end of said arm with a takeoff drive shaft that extends from said motorcycle body coaxially with the axis of rotation of said arm with respect to said motorcycle body, and wherein said drive chain is engaged at said forward end of said arm with a forward drive sprocket that is splined to said forward drive shaft.

11. A one-sided front wheel drive and suspension system for a motorcycle having a motorcycle body and a front wheel, comprising:
    an upper control arm and a lower control arm each having a forward end and a rear end, said control arms being hinged at said rear ends to said motorcycle body and extending generally forwardly therefrom, said lower control arm extending along one side of said front wheel of said motorcycle and being spaced outwardly therefrom sufficiently to allow for steering motion of said front wheel;
    an upright kingpin extending along the same side of said front wheel as said lower control arm, said kingpin having upper and lower ends, said kingpin being oriented at a rake angle with respect to said front wheel, said upper end of said kingpin extending around said front wheel;
    said forward end of said upper control arm being connected for universal pivotal motion to said upper end of said kingpin, said front wheel being journalled to said lower end of said kingpin by means of a cantilevered axle assembly extending from one side of said lower end of said kingpin, said upper end of said kingpin being connected to a steering column;

said lower control arm supporting drive means extending its length and operably connecting a takeoff drive shaft extending from said motorcycle body with a forward drive shaft extending transversely from and journalled in said forward end of said lower control arm;

said forward drive shaft being connected through a constant velocity joint to a wheel drive means on said kingpin, said constant velocity joint operating in a dual capacity to connect said forward end of said control arm to said kingpin for universal pivotal motion and to transmit power from forward drive shaft to said front wheel;

whereby power is transmitted directly to said front wheel while nevertheless allowing said front wheel to undergo limited rotational and translational displacement due to steering rotation and suspension travel.

12. The one-sided front wheel drive and suspension system for a motorcycle defined in claim 11, wherein said wheel drive means comprises a kingpin sprocket journalled to said kingpin, and wherein said axle assembly includes a wheel sprocket, said wheel sprocket and said kingpin sprocket being connected by a wheel drive chain extending along said kingpin.

13. The one-sided front wheel drive and suspension system for a motorcycle defined in claim 12, wherein said constant velocity joint is a ball-and-socket constant velocity joint, and wherein said kingpin sprocket is splined to a splined end of a shaft extending from a socket element of said ball-and-socket constant velocity joint, said shaft extending from said socket element through said kingpin, and said shaft being journalled in said kingpin between said socket element and said splined end.

14. The one-sided front wheel drive and suspension system for a motorcycle defined in claim 11, wherein said front drive shaft is journaled within a tubular shaft housing extending transversely from said forward end of said lower control arm, and wherein said tubular shaft housing is connected to said kingpin by a tubular yoke positioned coaxially about said front drive shaft, said yoke being rotatable about said tubular shaft housing but being retained against axial displacement relative thereto, and said yoke being hinged to said kingpin by two pivot pins having axes of rotation which are coaxial with the axis of steering motion of said kingpin.

15. The one-sided front wheel drive and suspension system for a motorcycle defined in claim 14, wherein said kingpin includes an integral kingpin housing in which said constant velocity joint is housed, said housing opening toward said tubular shaft housing, said yoke including integral opposing ears at its end distal from said shaft housing, said kingpin housing being sized to receive said opposing ears of said yoke, said ears of said yoke including threaded bores for engaging said pivot pins, and wherein said pivot pins extend through opposing bores in said housing to engage said ears of said yoke.

16. The one-sided front wheel drive and suspension system for a motorcycle defined in claim 15 further comprising a flexible dust boot extending between said kingpin housing and said shaft housing so as to enclose said yoke and said constant velocity joint.

17. The one-sided front wheel drive and suspension system for a motorcycle defined in claim 11 wherein said constant velocity joint is a ball-and-socket constant velocity joint, and wherein said front drive shaft includes at one end an integral ball element of said ball-and-socket constant velocity joint.

18. The one-sided front wheel drive and suspension system for a motorcycle defined in claim 15 wherein said constant velocity joint is a ball-and-socket constant velocity joint, and wherein said front drive shaft includes at one end an integral ball element of said ball-and-socket constant velocity joint.

19. The one-sided front wheel drive and suspension system for a motorcycle defined in claim 11, wherein said drive means supported by said lower control arm comprises a control arm drive chain.

20. The one-sided front wheel drive and suspension system for a motorcycle defined in claim 19, wherein said control arm drive chain is housed within said lower control arm.

21. The one-sided front wheel drive and suspension system for a motorcycle defined in claim 20, wherein said control arm drive chain is engaged at said rear end of said lower control arm with a takeoff drive shaft which extends from said motorcycle body coaxially with the axis of rotation of said lower control arm with respect to said motorcycle body, and wherein said control arm drive chain is engaged at said forward end of said lower control arm with a forward drive sprocket that is splined to said forward drive shaft.

22. The one-sided front wheel drive and suspension system for a motorcycle defined in claim 21, wherein said rear end of said lower control arm includes integral left-hand and right-hand sections, a first one of said sections housing said control arm drive chain and extending forwardly from the side of said motorcycle body from which said takeoff drive shaft extends, said first section being journalled in a first pivot bearing seated in said motorcycle body coaxially about said takeoff drive shaft, the second of said sections extending transversely in front of said motorcycle body to a pivot plate which is removably connected to said second section, said pivot plate being journalled to a second pivot bearing seated in said motorcycle body and oriented coaxially with said first pivot bearing.

23. The one-sided front wheel drive and suspension system for a motorcycle defined in claim 22, wherein said pivot plate includes an adjustable and lockable pivot adjustor which is journalled in said second bearing, whereby said lower control arm can be installed and adjusted to be free of play.

24. The one-sided front wheel drive and suspension system for a motorcycle defined in claim 11 wherein said steering column is a telescopic splined steering column, and wherein said steering column is connected for universal pivotable motion to said upper end of said kingpin to accommodate suspension travel of said kingpin.

25. The one-sided front wheel drive and suspension system for a motorcycle defined in claim 24 wherein said steering column is connected to said upright kingpin by a flexible disk coupling.

26. In a motorcycle having a one-sided front wheel suspension system in which a control arm extends forwardly from a motorcycle body along one side of the front wheel to an upright kingpin, a front wheel drive system comprising:

drive means supported by said control arm, said drive means extending the length of said control arm and operably connecting a takeoff drive shaft extending from said motorcycle body with a forward drive shaft extending transversely from and journalled in said forward end of said control arm;

said forward drive shaft being connected through a constant velocity joint to a wheel drive means on said kingpin, said wheel drive means including a kingpin sprocket journalled to said kingpin, and wherein said wheel is affixed to an axle assembly which extends in a cantilevered manner from a lower end of said kingpin, said axle assembly including a wheel sprocket, said wheel sprocket and said kingpin sprocket being connected by a wheel drive chain extending along said kingpin, said constant velocity joint operating to connect said forward drive shaft to said wheel drive means and to thereby transmit power from said forward drive shaft to said front wheel;

said forward end of said control arm being connected for universal pivotal motion to said kingpin;

whereby power is transmitted directly to said front wheel while nevertheless allowing said front wheel to undergo limited rotational and translational displacement due to steering rotation and suspension travel.

27. The front wheel drive system defined in claim 26, wherein said constant velocity joint is a ball-and-socket constant velocity joint, and wherein said kingpin sprocket is splined to a splined end of a shaft extending from a socket element of said ball-and-socket constant velocity joint, said shaft extending from said socket element through said kingpin, and said shaft being journalled in said kingpin between said socket element and said splined end.

28. The front wheel drive system defined in claim 27, wherein said front drive shaft is journalled within a tubular shaft housing extending transversely from a forward end of said control arm, and wherein said tubular shaft housing is connected to said kingpin by rotatable tubular yoke retained coaxially about said front drive shaft, said yoke being rotatable about said tubular shaft housing and being retained against axial displacement relative thereto, and said yoke being hinged to said kingpin by two pivot pins having axes of rotation which are coaxial with the axis of steering motion of said kingpin.

* * * * *